United States Patent [19]

Aoyama et al.

[11] Patent Number: 4,741,952

[45] Date of Patent: May 3, 1988

[54] MAGNETIC RECORDING MEDIUM

[75] Inventors: Shigeo Aoyama, Kyoto; Yoshinori Yamamoto, Takatsuki; Kenji Sumiya, Suita, all of Japan

[73] Assignee: Hitachi Maxell, Ltd., Osaka, Japan

[21] Appl. No.: 840,581

[22] Filed: Mar. 19, 1986

[30] Foreign Application Priority Data

Mar. 20, 1985 [JP] Japan .................................. 60-56440

[51] Int. Cl.$^4$ ......................... G11B 5/70; G11B 5/708
[52] U.S. Cl. .................................... 428/323; 427/128; 428/329; 428/694; 428/900
[58] Field of Search ............... 428/694, 900, 323, 329; 427/128

[56] References Cited

U.S. PATENT DOCUMENTS

| | | | |
|---|---|---|---|
| 3,630,910 | 12/1971 | Akashi et al. | 252/62.54 |
| 4,117,190 | 9/1978 | Akashi et al. | 428/900 |
| 4,420,408 | 12/1983 | Kajimoto et al. | 428/329 |
| 4,420,532 | 12/1983 | Yamaguchi et al. | 427/128 |
| 4,442,171 | 4/1984 | Sato et al. | 428/694 |
| 4,469,758 | 9/1984 | Scott | 428/900 |
| 4,511,484 | 4/1985 | Aononuma et al. | 427/128 |
| 4,584,243 | 4/1986 | Kadokura et al. | 427/128 |

*Primary Examiner*—Paul J. Thibodeau
*Attorney, Agent, or Firm*—Birch, Stewart, Kolasch & Birch

[57] ABSTRACT

A magnetic recording medium comprising a substrate material and a magnetic layer provided thereon, said magnetic layer containing magnetic particles and a resinous binder, characterized in that the magnetic layer further comprises non-magnetic particles of complex oxides or oxide solid solutions of a $SiO_2$ or $TiO_2$ system. Said magnetic recording medium is excellent in running stability, durability and surface smoothness.

8 Claims, No Drawings

MAGNETIC RECORDING MEDIUM

The present invention relates to a magnetic recording medium improved in running stability and durability without deterioration of surface smoothness.

In magnetic recording media (e.g. magnetic recording tapes, magnetic recording discs) comprising a substrate material and a magnetic layer containing magnetic particles and a resinous binder provided on said substrate material, the magnetic layer is apt to be worn away due to its contact with a magnetic head as well as a pad under a high velocity at recording and reproducing. Thus, development of a magnetic recording medium excellent in running stability and durability has been highly desired.

For this purpose, it was proposed to incorporate non-magnetic oxide particles such as $Al_2O_3$ particles or $TiO_2$ particles into a magnetic layer. However, these non-magnetic oxide particles are poor in affinity to the resinous binder in the magnetic layer and therefore the uniform dispersion these particles in the magnetic layer is not well attained. For this reason, the magnetic recording medium has not been sufficiently improved in running stability and durability. Further, the surface smoothness of the magnetic layer is deteriorated, whereby the electro-magnetic exchange characteristics are lowered.

As a result of an extensive study for overcoming this drawback, it has now been found that the incorporation of non-magnetic particles of complex oxides or oxide solid solutions comprising $SiO_2$ or $TiO_2$ into the magnetic layer is highly effective in the improvement of the running stability and durability of the magnetic recording medium. Since the dispersibility of those non-magnetic particles in the magnetic layer is excellent, no deterioration in the surface smoothness of the magnetic layer is observed. This invention is based on the above finding.

According to this invention, there is provided a magnetic recording medium having high running stability and durability while maintaining good surface smoothness, which comprises a substrate material and a magnetic layer provided thereon, said magnetic layer containing magnetic particles and a resinous binder, characterized in that the magnetic layer further comprises non-magnetic particles chosen from complexes and solid solutions of oxides of a $SiO_2$ or $TiO_2$ system.

The magnetic recording medium comprises a substrate material and a magnetic layer(s) provided on one or two surfaces of said substrate material. As the substrate material, there may be used, for instance, a polymeric film such as a polyethylene terephthalate film or a polyvinyl acetate film.

The magnetic layer comprises magnetic particles and a resinous binder. As the magnetic particles, there may be used metallic iron, metallic cobalt, iron or cobalt alloy, iron-nickel alloy, gamma-$Fe_2O_3$, $Fe_3O_4$, Co-containing gamma-$Fe_2O_3$, Co-containing $Fe_3O_4$, etc. The average particle size of the magnetic particles is usually from 0.03 to 0.8 microns, preferably from 0.1 to 0.5 microns. Examples of the resinous binder are vinyl chloride/vinyl acetate copolymer, polyvinyl butyral, cellulose resin, polyurethane, polyester, isocyanate compounds, etc.

In this invention, it is characteristic that the magnetic layer comprises further non-magnetic particles of at least one complex oxides and oxide solid solutions of a $SiO_2$ or $TiO_2$ system. The complex oxides of the $SiO_2$ or $TiO_2$ system may constitute $SiO_2$ or $TiO_2$ and at least one of other oxides in a constant or definite proportion. Examples of such complex oxides are aluminum titanate ($Al_2O_3.TiO_2$), forsterite ($2MgO.SiO_2$), enstatite ($MgO.SiO_2$), zircon ($ZrO_2.SiO_2$), mullite ($3Al_2O_3.2SiO_2$) cordierite ($2MgO.2Al_2O_3.5SiO_2$), sapphirine ($4MgO.5Al_2O_3.2SiO_2$), spodumene ($Li_2O.Al_2O_3.4SiO_2$), eucryptite ($Li_2O.Al_2O_3.2SiO_2$), petalite ($Li_2O.Al_2O_3.8SiO_2$), beryl ($3BeO.Al_2O_3.6SiO_2$), celsian ($BaO.Al_2O_3.2SiO_2$), beryllium titanate ($3BeO.TiO_2$), anorthite ($CaO.Al_2O_3.2SiO_2$), barium titanate ($BaO.TiO_2$), magnesium titanate ($MgO.2TiO_2$), lead titanate ($PbO.TiO_2$), strontium aluminum silicate ($SrO.Al_2O_3.2SiO_2$), calcium silicate ($CaO.2SiO_2$), iron titanate ($FeO.TiO_2$), calcium titanate ($CaO.TiO_2$), etc. Among them, preferred are mullite, aluminum titanate, cordierite, zircon, spodumene, eucryptite, etc., and particularly preferred are mullite, aluminum titanate, cordierite, etc. The oxide solid solutions of a $SiO_2$ or $TiO_2$ system may also constitute $SiO_2$ or $TiO_2$ and at least one of other oxides, but the proportion of these oxide components is not constant or definite. Examples of the oxides which constitute said oxide solid solutions may be those which constitute the complex oxides.

The average particle size of the non-magnetic particles is normally not more than about 2.0 microns, preferably from about 0.1 to 0.5 micron. When the average particle size exceeds the upper limit, the surface smoothness is apt to be deteriorated. When the particle size is too small, the running stability and the durability are not sufficiently improved. The hardness of the non-magnetic particles depends on the type of the particle and is usually not less than about 4 in Moh's hardness, preferably not less than about 6 in Moh's hardness. No definite upper limit is present, but in general it may be not more than 9 in Moh's hardness.

The type of non-magnetic particles is not necessarily limited to a single type. Two or more types may be employed. In general, non-magnetic particles may be used in an amount from about 0.1 to 25 parts by weight, preferably from about 1 to 10 parts by weight, per 100 parts by weight of the magnetic particles. When the amount is too small, no improvement of the running stability and the durability will be attained. When the amount is too large, the proportion of the magnetic particles is reduced so that the electromagnetic exchange characteristics will be deteriorated.

Preparation of the magnetic recording medium of the invention may be carried out by a conventional procedure. For instance, a magnetic coating composition is first prepared by mixing the magnetic particles, the non-magnetic particles and the resinous binder in a dispersing liquid medium to form a uniform dispersion. As the dispersing liquid medium, there is usually employed an organic solvent chosen from ketones (e.g. cyclohexanone, methyl ethyl ketone, methyl isobutyl ketone), esters (e.g. ethyl acetate, butyl acetate), aromatic hydrocarbons (e.g. benzene, toluene, xylene), alcohols (e.g. isopropanol), acid amides (e.g. dimethylformamide), sulfoxides (e.g. dimethylsulfoxide), ethers (e.g. tetrahydrofuran, dioxane), etc. to give a solution type coating composition. In addition to or in place of the organic solvent, water and an emulsifier may be also used so as to give an emulsion type coating composition. In any event, other additives such as dispersing agents, lubricating agents, polishing agents and antistatic agents may be optionally incorporated into the coating composition. The contents of the magnetic particles, the non-magnetic particles and the resinous binder in the magnetic coating composition are not limitative, but usually the weight proportion of the combined amount of the magnetic particles and the non-magnetic particles and the amount of the resinous binder may be from about 6:4 to 9:1.

The resultant magnetic coating composition formed is then applied onto at least one surface of a substrate material by the aid of a conventional applicator such as a roll coater, followed by drying to form a magnetic layer.

The thus prepared magnetic recording medium having a magnetic layer incorporated with non-magnetic particles of certain complex oxides or oxide solid solutions shows excellent running stability and durability. Further, the surface smoothness of the magnetic recording medium is good.

Practical and presently preferred embodiments of the invention are illustratively shown in the following Examples wherein part(s) and % are by weight.

EXAMPLE 1

| | Part(s) |
|---|---|
| Co-containing gamma-$Fe_2O_3$ magnetic particles | 100 |
| VAGH (vinyl chloride/vinyl acetate/vinyl alcohol co-polymer; manufactured by Union Carbide Corp.) | 18 |
| Takelac E-551T polyurethane elastomer; manufactured by Takeda Chemical Industries, Ltd.) | 12 |
| Desmodule L (trifunctional low molecular weight isocyanate compound; manufactured by Bayer AG) | 3 |
| Mullite ($3Al_2O_3.SiO_2$) particles (average particle size, 0.2 micron) | 5 |
| Lauric acid | 2 |
| Cyclohexanone | 80 |
| Toluene | 80 |

The above materials were well mixed for 100 hours in a ball mill to prepare a magnetic coating composition. The resulting coating composition was applied to a surface of a polyester base film of 12 microns in thickness to form a magnetic layer having a dry thickness of 3 microns and dried, followed by surface treatment and cutting in a predetermined width to make a magnetic recording tape.

EXAMPLE 2

Preparation of a magnetic recording tape was carried out in the same manner as in Example 1 but using 5 parts of aluminum titanate ($Al_2O_3.TiO_2$) having an average particle size of 0.2 micron instead of mullite.

EXAMPLE 3

Preparation of a magnetic recording tape was carried out in the same manner as in Example 1 but using 5 parts of zircon ($ZrO_2.SiO_2$) having an average particle size of 0.2 micron instead of mullite.

EXAMPLE 4

Preparation of a magnetic recording tape was carried out in the same manner as in Example 1 but using 5 parts of cordierite ($2MgO.2Al_2O_3.5SiO_2$) having an average particle size of 0.2 micron instead of mullite.

COMPARATIVE EXAMPLE 1

Preparation of a magnetic recording tape was carried out in the same manner as in Example 1 but using 5 parts of alumina ($Al_2O_3$) having an average particle size of 0.2 micron instead of mullite.

With respect to each of the magnetic recording tapes as prepared in Exmaples 1 to 4 and Comparative Example 1, running stability (wow and flutter), durability (decrease of S/N ratio after 100 running in comparison with that before running) and surface smoothness (average surface roughness at centerline) were examined, and the results are shown in following Table.

TABLE

| Example | Running stability (%) | Durability (dB) | Surface smoothness (micron) |
|---|---|---|---|
| 1 | 0.13 | 0.5 | 0.006 |
| 2 | 0.15 | 0.5 | 0.005 |
| 3 | 0.19 | 0.8 | 0.006 |
| 4 | 0.14 | 0.6 | 0.005 |
| Comparative 1 | 0.50 | 4.3 | 0.009 |

It is understood from the above Table that the magnetic recording tape according to the invention is excellent in running stability, durability and surface smoothness.

We claim:

1. A magnetic recording medium comprising a substrate material and a magnetic layer provided on said substrate material, said magnetic layer containing magnetic particles and a resinous binder, characterized in that the magnetic layer further comprises, per 100 parts by weight of the magnetic particles, from about 0.1 to 25 parts by weight of non-magnetic particles of complex oxides or oxide solid solutions of a $Al_2O_3.SiO_2$ system.

2. The magnetic recording medium according to claim 1, wherein said non-magnetic particles are of at least one member selected from the group consisting of mullite ($3Al_2O_3.2SiO_2$), cordierite ($2MgO.2Al_2O_3.5SiO_2$), sapphirine ($4MgO.5Al_2O_3.2SiO_2$), spodumene ($Li_2O.Al_2O_3.4SiO_2$), eucryptite ($Li_2O.Al_2O_3.2SiO_2$), petalite ($Li_2O.Al_2O_3.8SiO_2$), beryl ($3BeO.Al_2O_3.6SiO_2$), celsian ($BaO.Al_2O_3.2SiO_2$), anorthite ($CaO.Al_2O_3.2SiO_2$) and strontium aluminum silicate ($SrO.Al_2O_3.2SiO_2$).

3. The magnetic recording medium according to claim 1, wherein the non-magnetic particles are of at least one member selected from the group consisting of mullite ($3Al_2O_3.SiO_2$) and cordierite ($2MgO.2Al_2O_3.5SiO_2$).

4. The magnetic recording medium according to claim 1, wherein the non-magnetic particles are of mullite ($3Al_2O_3.2SiO_2$).

5. The magnetic recording medium according to claim 1, wherein the average particle size of the non-magnetic particle does not exceed about 2.0 microns.

6. The magnetic recording medium according to claim 1, wherein the average particle size of the non-magnetic particles is from about 0.1 to 0.5 micron.

7. The magnetic recording medium according to claim 1, wherein the non-magnetic particles have a Mohs hardness of not less than about 4.

8. The magnetic recording medium according to claim 1, wherein the non-magnetic particles have a Mohs hardness of from about 6 to 9.

* * * * *